United States Patent [19]

Kiuchi et al.

[11] Patent Number: 5,067,413
[45] Date of Patent: Nov. 26, 1991

[54] APPARATUS FOR CONVEYING TRAVELABLE BODY

[75] Inventors: Naoyuki Kiuchi, Ibaraki; Masanori Fujimaru, Osaka; Susumu Nakagawa, Amagasaki; Eiji Taguchi, Osaka; Masao Kasagi, Tokyo; Akio Kimura, Yokosuka; Shinji Kawabe, Yokosuka, all of Japan

[73] Assignees: Daifuku Co., Ltd.; Kanto Jidosha Kogyo Kabushiki Kaisha, both of Japan

[21] Appl. No.: 474,265

[22] Filed: Feb. 1, 1990

[30] Foreign Application Priority Data

| Feb. 9, 1989 | [JP] | Japan | 1-30494 |
| Feb. 9, 1989 | [JP] | Japan | 1-30495 |
| Jul. 10, 1989 | [JP] | Japan | 1-178791 |
| Jul. 10, 1989 | [JP] | Japan | 1-178792 |

[51] Int. Cl.⁵ .......................................... B65G 39/00
[52] U.S. Cl. ................................................. 104/168
[58] Field of Search ............... 104/162, 163, 168, 170, 104/165; 198/465.1, 465.2, 624

[56] References Cited

U.S. PATENT DOCUMENTS

| 3,039,402 | 6/1962 | Richardson | 104/168 |
| 3,590,524 | 7/1971 | Beny | 104/168 |
| 3,752,334 | 8/1973 | Robinson et al. | 104/168 |
| 4,564,100 | 1/1989 | Moon | 104/168 |

FOREIGN PATENT DOCUMENTS

| 1268172 | 6/1959 | Fed. Rep. of Germany | 104/168 |
| 1167872 | 2/1960 | Fed. Rep. of Germany | 104/168 |
| 1287598 | 6/1962 | Fed. Rep. of Germany | 104/168 |
| 1455008 | 10/1969 | Fed. Rep. of Germany | 104/168 |
| 1235381 | 5/1960 | France | 104/168 |
| 1370670 | 7/1964 | France | 104/168 |
| 1376637 | 9/1964 | France | 104/168 |
| 0002865 | 1/1984 | Japan . | |
| 0131357 | 9/1984 | Japan . | |
| 0050021 | 9/1965 | Poland | 104/168 |
| 0630435 | 6/1978 | U.S.S.R. | 104/163 |
| 0617612 | 7/1978 | U.S.S.R. | 104/168 |
| 0755704 | 8/1980 | U.S.S.R. | 104/168 |
| 1001339 | 8/1965 | United Kingdom | 104/168 |

Primary Examiner—Robert J. Oberleitner
Assistant Examiner—Mark T. Le
Attorney, Agent, or Firm—Barnes, Kisselle, Raisch, Choate, Whittemore & Hulbert

[57] ABSTRACT

The invention relates to a device for conveying travelable bodies which are provided no driving source, on a fixed path. A plurality of travelable bodies can travel on the fixed path while aligned substantially in close contact with each other. Traveling power is transmitted to one of a plurality of travelable bodies which is positioned on at least one end of the alignment. The traveling power drives the travelable body with frictional force while pressing one side surface of the travelable body, and is transmitted to the travelable body while backing up the other side surface of the travelable body. A device to transmit traveling power is arranged on only a part of the fixed path.

10 Claims, 15 Drawing Sheets

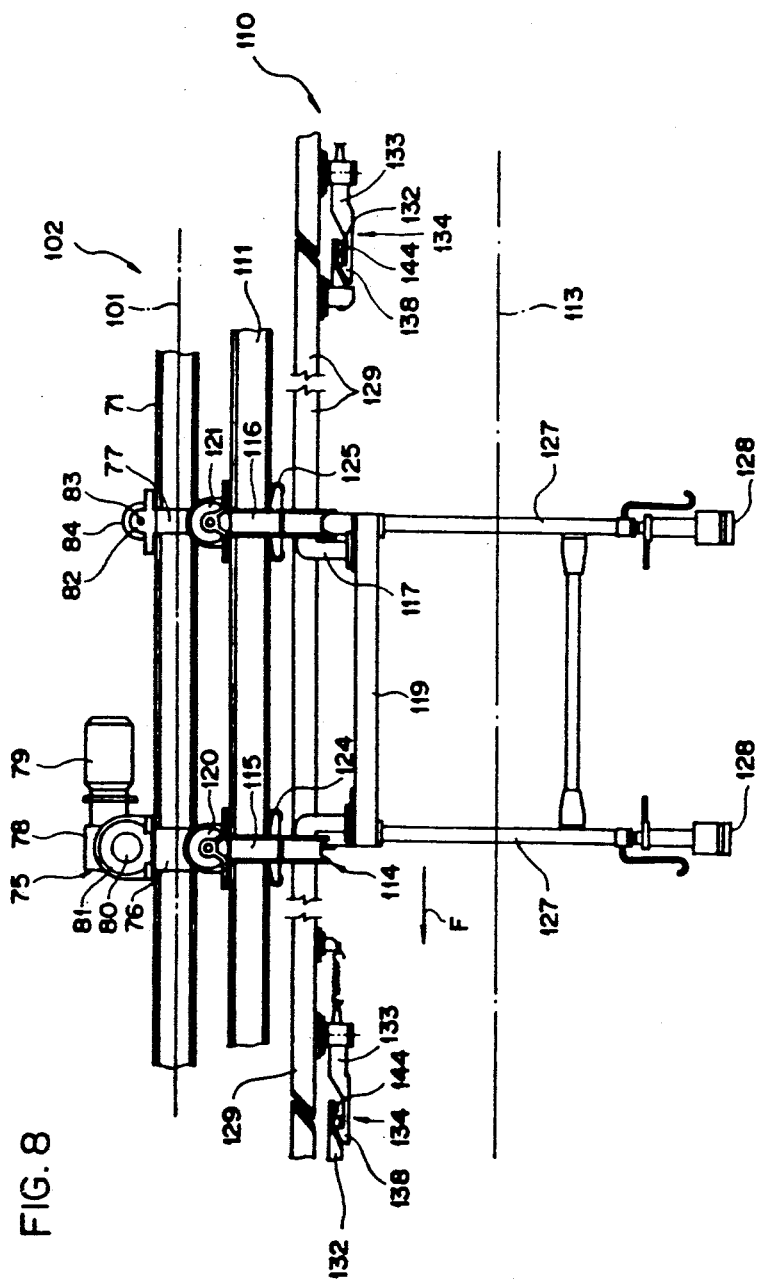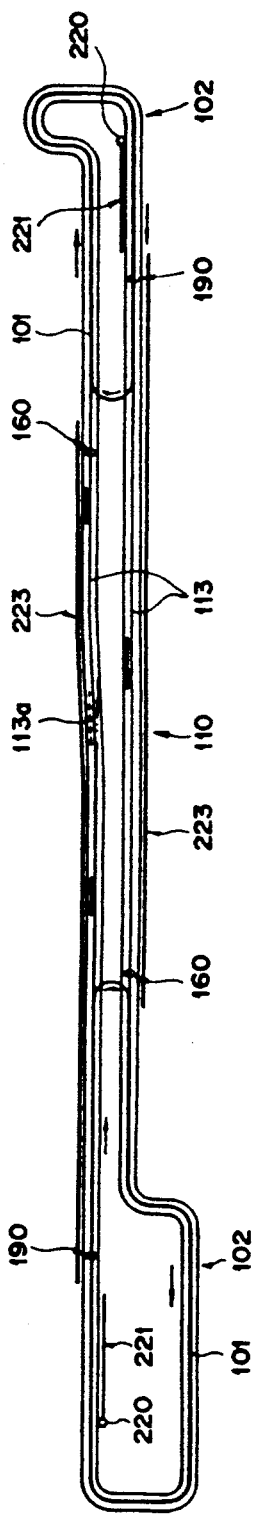

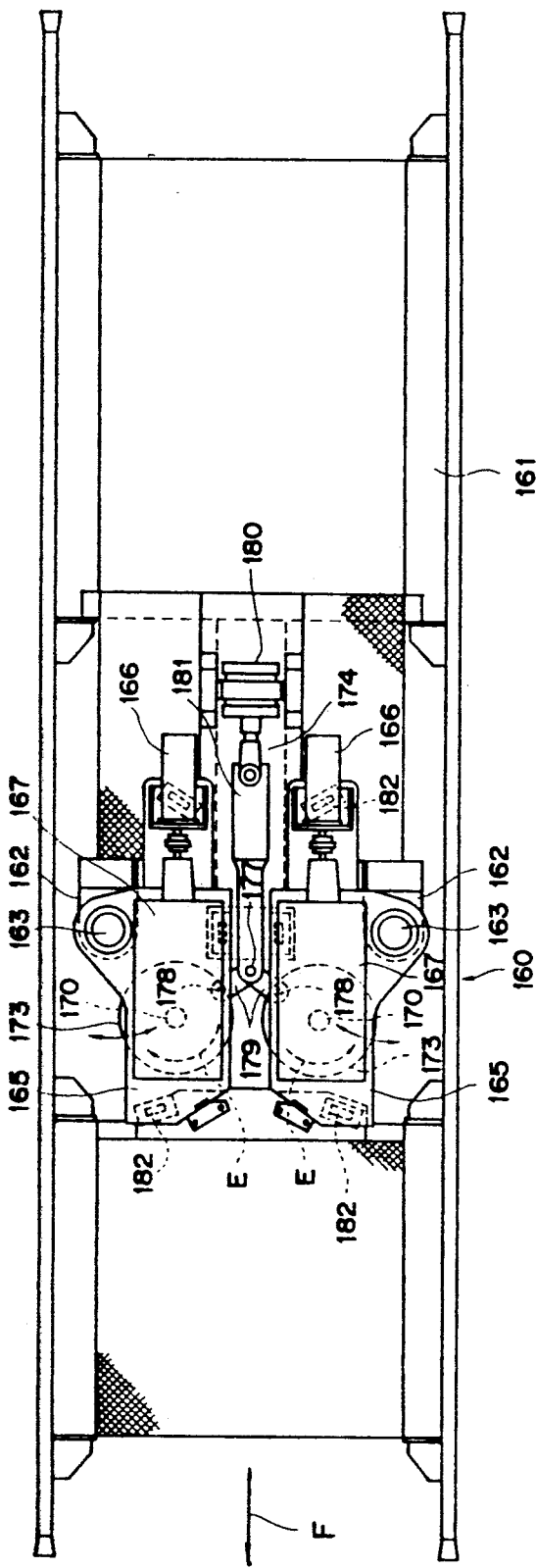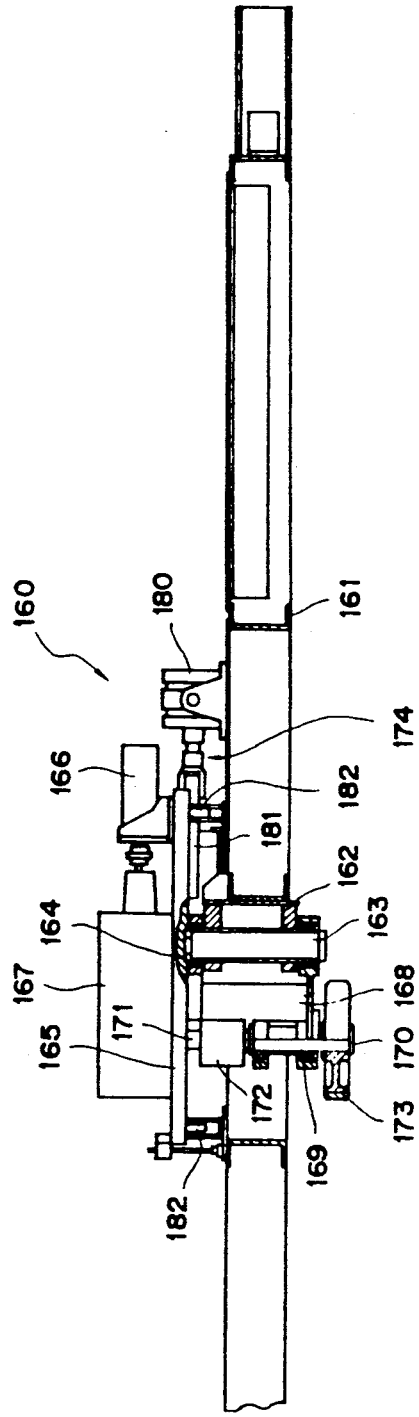

APPARATUS FOR CONVEYING TRAVELABLE BODY

FIELD OF THE INVENTION

This invention relates to an apparatus for conveying a travelable body provided with no driving source, such as a truck freely travelable on the floor and a trolley movable below the ceiling or the like, on a fixed path.

BACKGROUND OF THE INVENTION

As means for conveying a truck having no driving source on a certain fixed path, known is, as disclosed in the Japanese Utility Model Publication No. Sho 59-2865, an apparatus provided with a catcher downwardly suspended from the underside of the truck, a chain extended along a certain path, and projections prepared as a pusher, disposed at a plurality of points along the lengthwise direction of the chain, and adapted to be engageable with said catcher. According to this apparatus, conveying force of the chain is transmitted from the projection as the pusher to the catcher and conveys the truck on a fixed path.

For conveying a trolley having no driving source on a fixed path, as disclosed in the Japanese Utility Model Laid-Open No. Sho 59-131357, known is an apparatus provided with a follower dog which is to be moved upward and is disposed on the trolley supported and guided by the trolley guide rail, a chain supported and guided by the rail for the trolley driving device arranged above the trolley guide rail, and driving projection on the chain with which said follower dog is engageable. In this apparatus, driving force of the chain is transmitted through the driving projections to the follower dog for conveying the trolley on a certain path.

These known apparatuses, however, require an arrangement of the chain throughout the length of a path and the entire length of the path is structurally complicated, whereby the catcher and the follower dog must be fixed to the truck and trolley with high precision.

DISCLOSURE OF THE INVENTION

An object of this invention is to provide an apparatus capable of conveying a travelable body with a certain fixed intensity of conveying force any time, which device satisfies the purpose when set only on a part of the fixed path and allows the remaining part to be free of structural complexity as well as eliminates the necessity of providing follower members for the travelable body.

For attaining the above object, an apparatus of this invention for conveying a travelable body is provided with:

a fixed path on which a plurality of travelable bodies can freely travel while aligned to be substantially in close contact with each other; and means to transmit driving force to said travelable bodies; wherein said driving force transmitting means is disposed to correspond to at least one of a plurality of travelable bodies which is positioned at the extreme end of the alignment;

said traveling force transmitting means is provided with driving means to press one of both sides of said travelable body and driving said travelable body with frictional force; and means to back up the pressure exerted by said driving means to one side of the travelable body at the other side of said body.

In such a structure as above, traveling force is imparted to the travelable body by traveling force transmitting means disposed on a part of the fixed path and no device is required to be set on almost the remaining part of the fixed path for driving the travelable body. Accordingly, a large part of the fixed path is simple and free of complexity in structure. Fixation of the catcher to the travelable body at high precision is not required and the structure is made simple. The travelable body driven by traveling force transmitting means with frictional force enables driving more noiseless than the known one with chain.

BRIEF DESCRIPTION OF THE DRAWINGS

FIG. 8 is a partially cutaway side view of a travelable body conveying device of another embodiment of this invention;

FIG. 12 is a schematic plan view of the whole of a conveying apparatus as still another embodiment of this invention;

FIGS. 16 through 18 are a front, plan, and partially cutaway side views, respectively, of the travelable body driving apparatus in FIG. 12;

DESCRIPTION OF THE EMBODIMENTS

Figure 1:
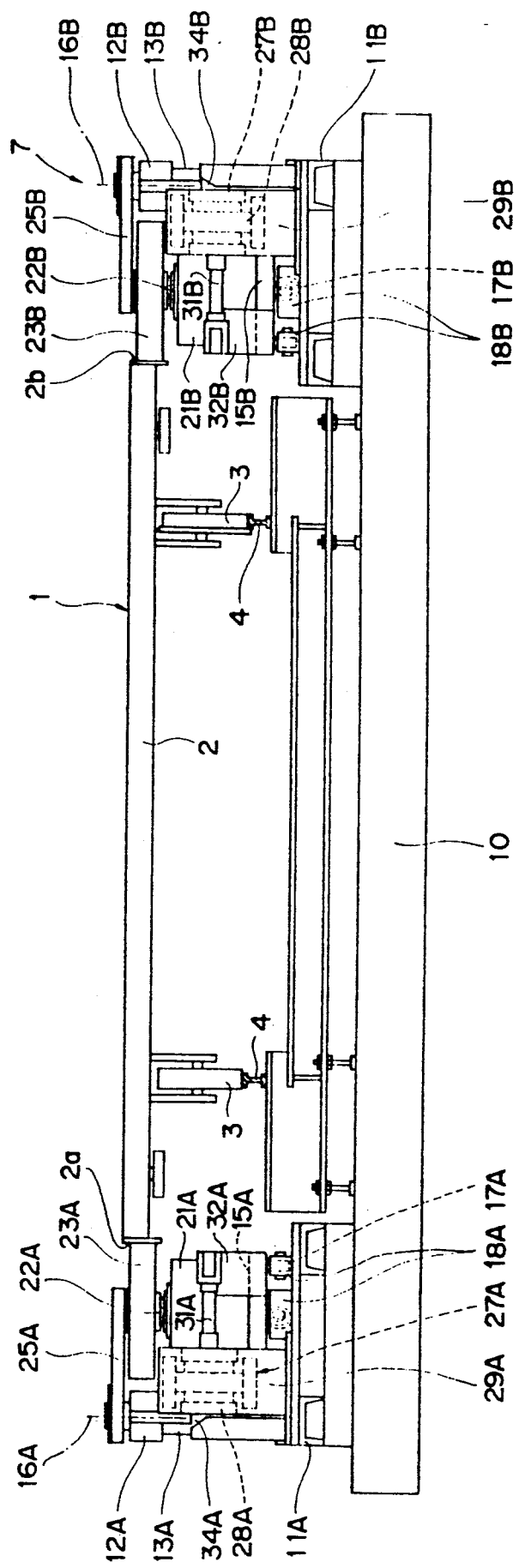
FIG. 1 is a front view of a travelable body driving device in a travelable body conveying apparatus as an embodiment of this invention.
Figure 2:
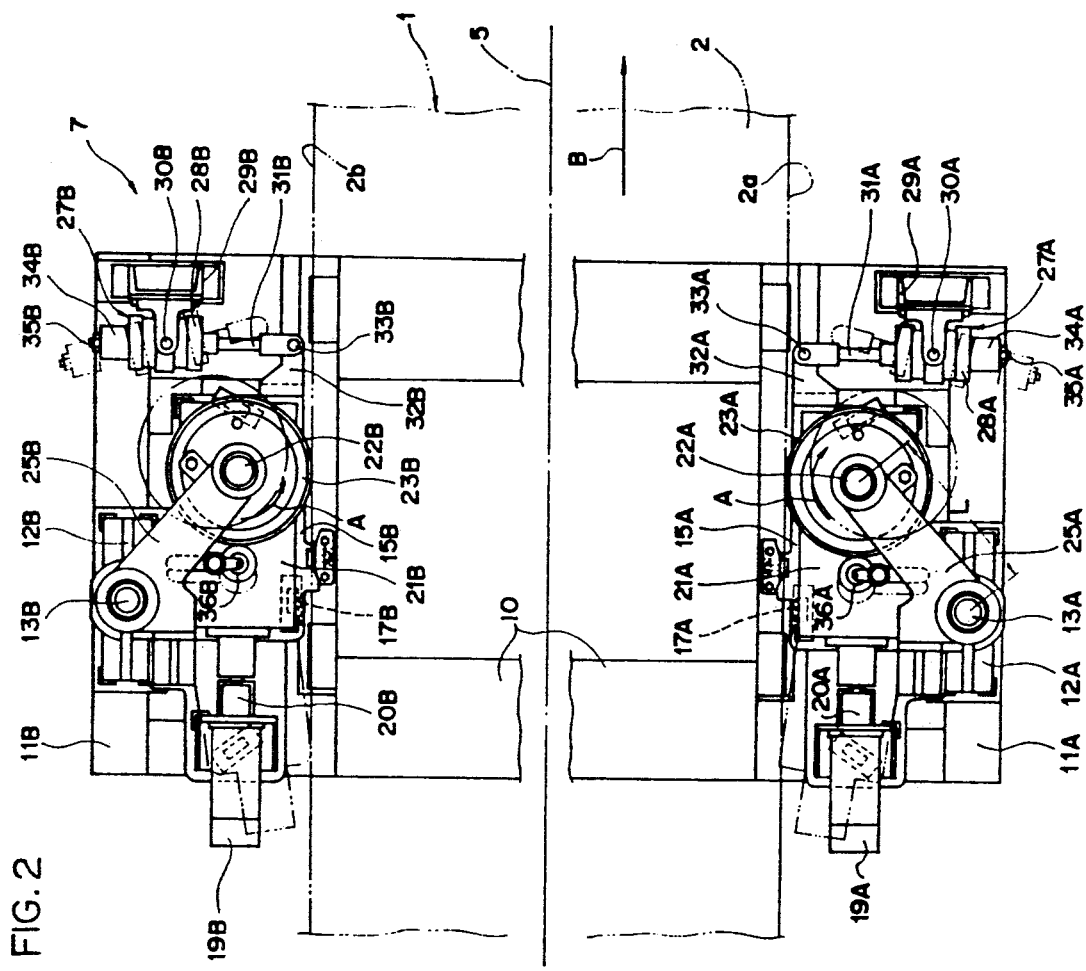
FIGS. 2 and 3 are a plan and a partially cutaway side view of said driving device, respectively.
Figure 3:
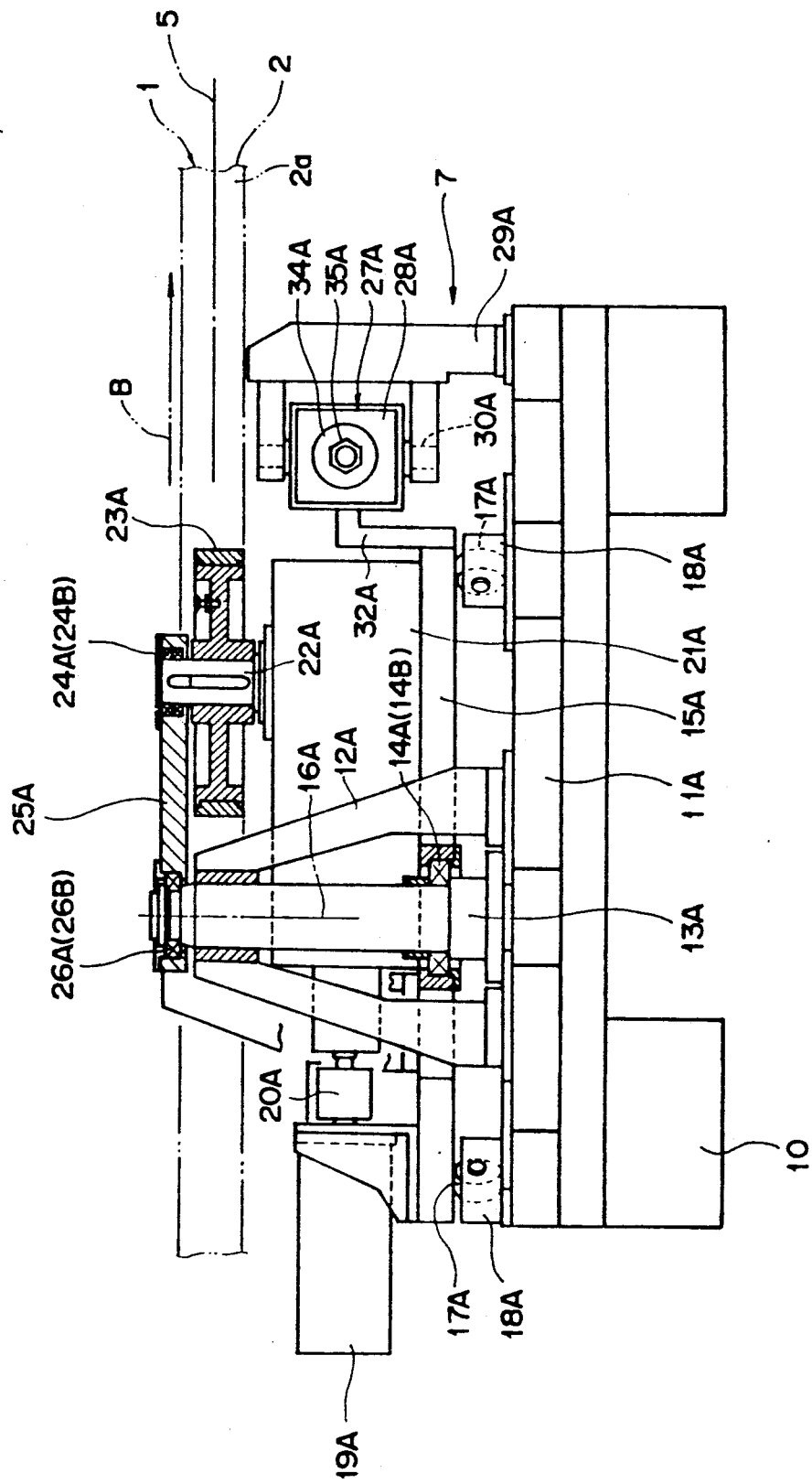

In FIGS. 1 through 4, the reference numeral 1 indicates a truck freely travelling on the floor as an example of travelable bodies and having a plurality of rotatable wheels 3 under the main body 2 thereof. The truck 1 is mounted on a pair of rails 4 through the wheels 3 and, thus, travelable on a fixed path 5 formed of the rails 4. On the starting end of the fixed path 5, a travelable body driving device 6 for feeding in and the similar device 7 for main conveying operation are disposed at appropriate intervals in the direction of the fixed path 5. On the terminal end of the fixed path 5, a travelable body driving device 8 for delivering out is disposed and, on the side slightly upstream of this driving device 8, a braking device 9 is disposed. The travelable body driving devices 6 through 8 are identical with each other in structure and the structure of the travelable body driving device 7 for main conveying operation will be described as hereunder, however, the detailed description of the structure of the driving devices 6 and 8 will be omitted.

On both ends of a base plate 10 provided under the rails 4, beds 11A, 11B are disposed to be positioned on both sides of the fixed path 5. Vertical axes 13A, 13B are erested on the beds 11A, 11B through stands 12A, 12B, respectively, and, under the vertical axes 13A, 13B, support tables 15A, 15B are swingably fixed around the vertical axes 16A, 16B through bearings 14A, 14B, respectively. A plurality of receiving rollers 17A, 17B to support the support tables 15A, 15B from below and adapt the tables to swing smoothly are disposed on the beds 11A, 11B through the brackets 18A, 18B.

Servomotors 19A, 19B are disposed on the support tables 15A, 15B and the driving shafts of the motors are connected to reduction gears 21A, 21B through the couplings 20A, 20B. To output shafts 22A, 22B projecting upwardly from the reduction gears 21A, 21B, pressing rollers 23A, 23B made of, for example, urethane are fixed. Vertical shafts 22A, 22B are positioned apart from the vertical shafts 16A, 16B at a fixed distance L. The base ends of the brackets 25A, 25B having tips fitted on the upper ends of the output shafts 22A, 22B through the bearings 24A, 24B are fitted on the upper ends of the vertical shafts 13A, 13B through the bearings 26A, 26B.

Telescopic devices to swingingly drive the support tables 15A, 15B are, for example, cylinder devices 27A, 27B whose main bodies 28A, 28B are fixed to the brackets 29A, 29B extending from the beds 11A, 11B through the vertical pins 30A, 30B. The forward ends of the piston rods 31A, 31B of the cylinder devices 27A, 27B are connected to the connecting members 32A, 32B extending from the support tables 15A, 15B.

The base ends of the piston rods 31A, 31B project rearward from the main bodies 28A, 28B and, to these projecting base ends, stroke adjusters 34A, 34B are fixed through the bolts 35A, 35B. The stroke adjusters 34A, 34B abut on the rear end surfaces of the main bodies 28A, 28B for controlling strokes of the piston rods 31A, 31B of the cylinder devices 27A, 27B. The length of stroke can optionally be varied by replacing stroke adjusters various in thickness with the bolts 35A, 35B manipulated, by gradually increasing or decreasing thickness as if using the shim, or by changing fixed positions for the piston rods 31A, 31B. Overload can be detected with a pressure-type load detecting device provided in stroke adjusters 34A, 34B. The numerals 36A, 36B indicate encoders disposed to constantly abut on the outer peripheries of the pressing rollers 23A, 23B while energized by, for example, springs.

Figure 5:
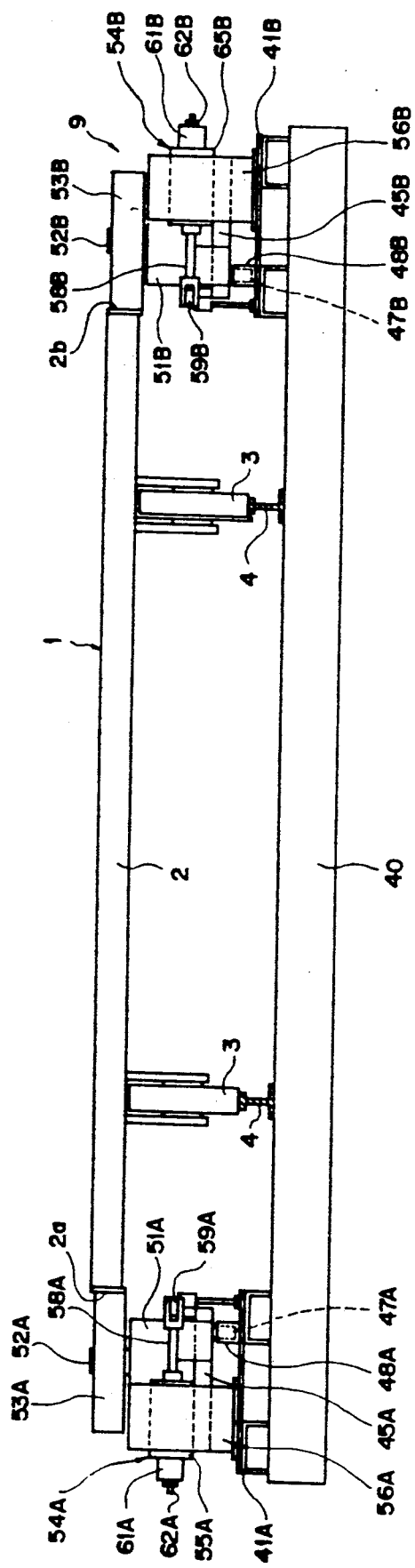
FIG. 5 is a front view of a braking device of a conveying apparatus as an embodiment of this invention.
Figure 6:
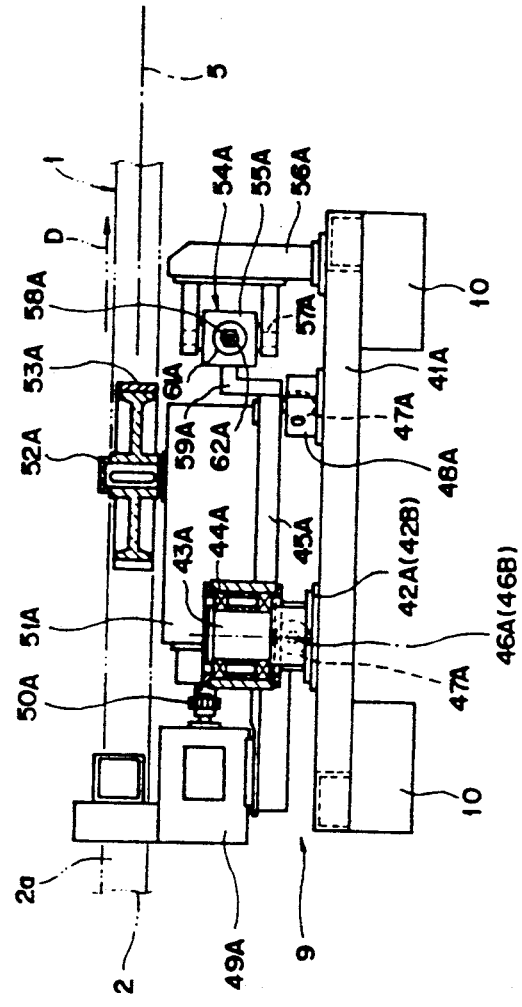
FIGS. 6 and 7 are a partially cutaway side view and a plan view of a braking device.
Figure 7:
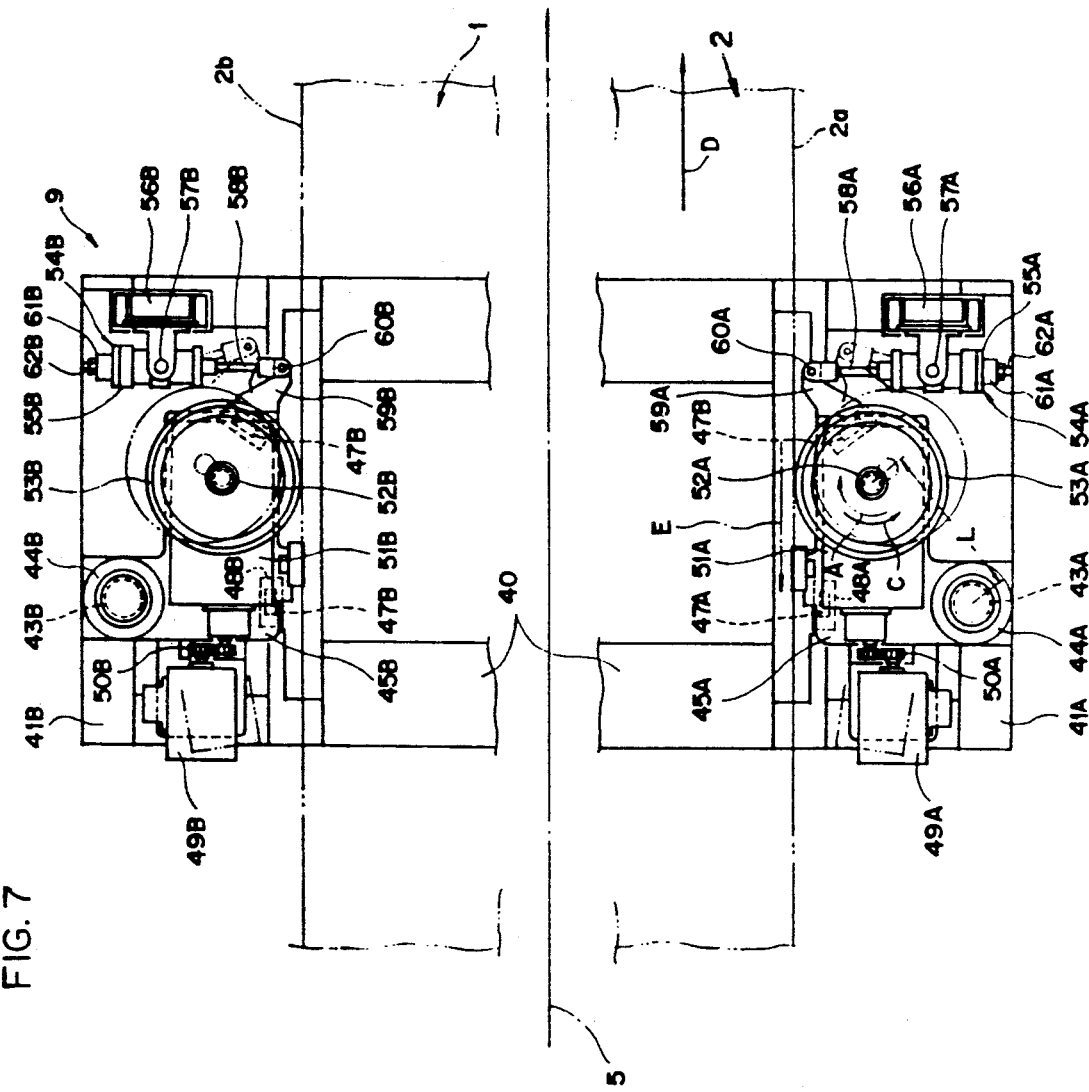

The braking device 9 is described in detail with reference to FIGS. 5 through 7.

Beds 41A, 41B to be positioned on both sides of the fixed path 5 are provided on both ends of a base plate 40 passing under the rails 4. Vertical shafts 43A, 43B are erected on these beds 41A, 41B through respective fixing members 42A, 42B, and the support tables 45A, 45B are swingably fixed to the vertical shafts 43A, 43B around the vertical shaft axes 46A, 46B through the bearings 44A, 44B. A plurality of receiving rollers 47A, 47B supporting the support tables 45A, 45B from below and smoothly swinging said tables are disposed on the beds 41A, 41B through the brackets 48A, 48B.

Torque motors 49A, 49B are disposed on the support tables 45A, 45B and the driving shafts thereof are rotatably connected to the reduction gears 51A, 51B on the support tables 45A, 45B through transmission gearing mechanisms 50A, 50B on the support tables 45A, 45B. Brake rollers 53A, 53B made of, for example, urethane are unmovably fixed to the output shafts 52A, 52B upwardly projecting from the reduction gears 51A, 51B. The output shafts 52A, 52B are positioned apart from the vertical shaft axes 46A, 46B at a fixed distance L.

Telescopic driving device for swingingly driving the support tables 45A, 45B are, for example, cylinder devices 54A, 54B and the main bodies thereof 55A, 55B are fixed to the brackets 56A, 56B extending from the beds 41A, 41B through the vertical pins 57A, 57B. The forward ends of the piston rods 58A, 58B of the cylinder devices 54A, 54B are connected to the connecting members 59A, 59B continuing from the support tables 45A, 45B.

The base ends of the piston rods 58A, 58B project rearward from the main bodies 55A, 55B and, to these projecting base ends, stroke adjusters 61A, 61B are fixed through the bolts and nuts 62A, 62B. The stroke adjusters 61A, 61B abut on the rear end surfaces of the main bodies 55A, 55B and thereby control the stroke of the piston rods 58A, 58B of the cylinder devices 54A, 54B. The length of stroke can optionally be varied by replacing stroke adjusters 61A, 61B various in thickness with the bolt and nut 62A, 62B manipulated, by gradually increasing and decreasing thickness as if using the shim, or by changing fixed positions for the piston rods 58A, 58B. Overload can be detected with a pressure-type load detector provided in stroke adjusters 61A, 61B.

Torque motors 49A, 49B drive the brake rollers 53A, 53B in the direction reverse to the conveyance direction by means of the pressing rollers 23A, 23B of the travelable body driving devices 6 through 8. Rotational force for conveyance exerted by the pressing rollers 23A, 23B are set stronger than counter conveyance force of the brake rollers 53A, 53B.

Then, a conveying operation for the truck 1 will be described.

Figure 4:
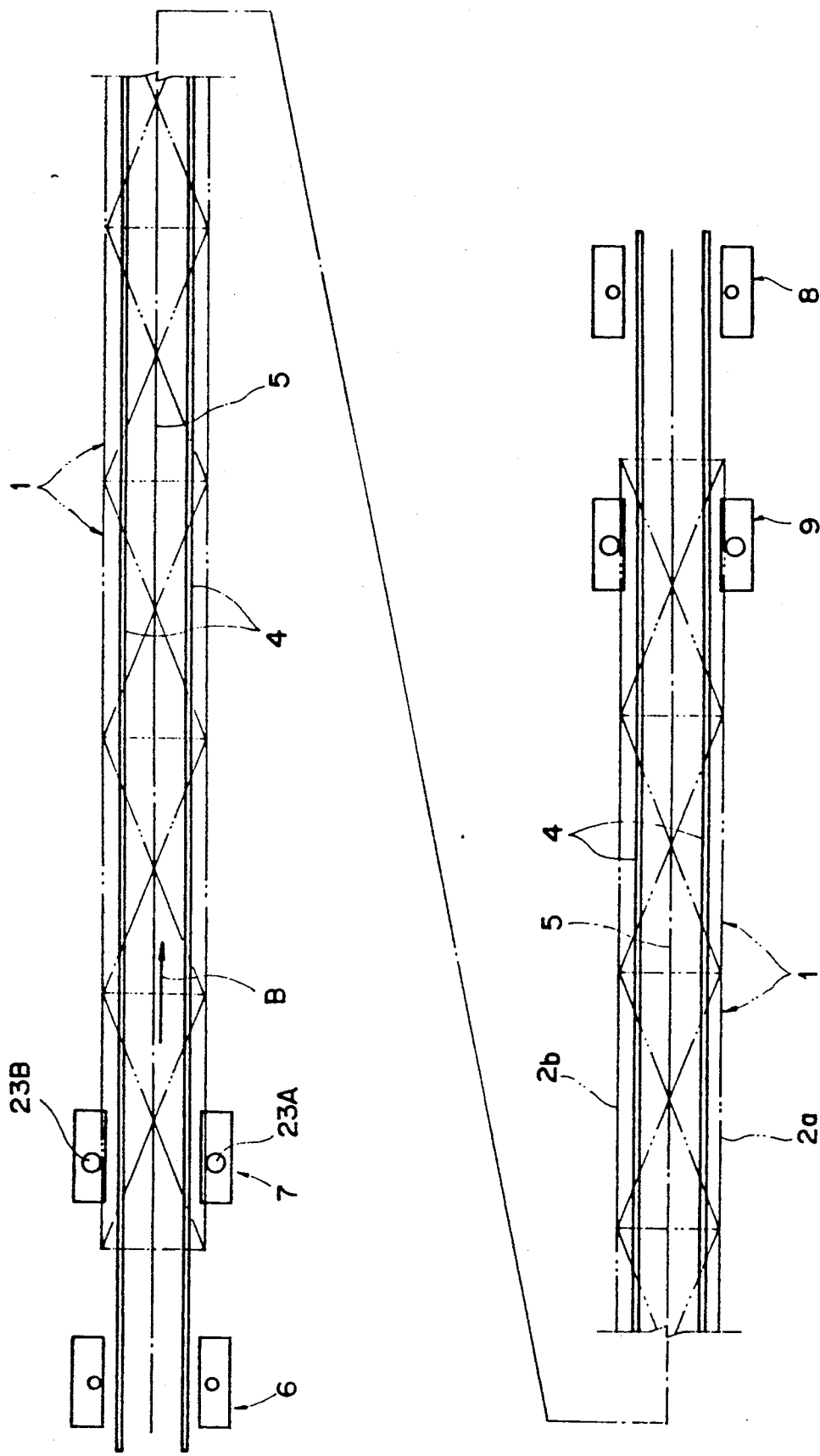
FIG. 4 is a schematic plan view of the whole of a conveying apparatus as an embodiment of this invention.

The truck 1 delivered to the starting end of the fixed path 5 as shown in FIG. 4 is operated by the manually operated pressor or the like so that the forward end of the truck may enter the feed-in travelable body conveying device 6. The truck 1 is conveyed in a short distance by the conveying device 6 for feeding-in on the fixed path 5 and then delivered to the main conveyance travelable body driving device 7. At this time, both cylinder devices 27A, 27B of the travelable body driving device 7 are contracted, whereby the support tables 15A, 15B are swung in the directions opposite to each other around the vertical shaft axes 16A, 16B and, therefore, the pressing rollers 23A, 23B are spaced from each other as indicated by an imaginary line in FIG. 2. Thus, a feeding-in operation is performed without obstruction. After feeding-in of the truck 1, both pressing rollers 23A, 23B are brought close to each other by the action counter to the above-said action and pressed to be in contact with the sides 2a, 2b of the main body 2.

At this time, the pressing rollers 23A, 23B are respectively rotated. More detailedly, the output shafts 22A, 22B are rotated in the directions opposite to each other by the servomotors 19A, 19B through the reduction gears 21A, 21B so as to forcedly rotate both pressing rollers 23A, 23B in the directions A opposite to each other. When the pressing rollers 23A, 23B under forced driving are pressed to be in contact with the sides 2a, 2b, traveling force is imparted to the truck 1 which, then, is conveyed in the direction B on the fixed path 5. At this time, both pressing rollers 23A, 23B are eccentric with respect to the vertical shafts 13A, 13B and generate force to enter into the truck 1, thereby imparting a large amount of traveling force to the truck 1. The truck 1 under traveling pushes forward a group of preceding trucks 1 stopping on the fixed path 5. The amount of conveyance of the truck 1 by (a plurality of) the travelable body driving devices 7 is detected by the encoders 36A, 36B and, when a certain amount of conveyance is detected, the pressing rollers 23A, 23B are spaced from each other and the conveyance operation is stopped.

The maximum amount of swing movement when the cylinder devices 27A, 27B inwardly swing the support tables 15A, 15B is regulated by stopping action caused when stroke adjusters 34A, 34B abut on the rear end surfaces of the main bodies 28A, 28B. In this way, the abovesaid eating force is controlled not to be excessive, thereby preventing overload.

The truck 1 having reached the terminal end of the fixed path 5 is braked by the braking device 9. When conveyance of the truck 1 by the travelable body driving device 7 is in stoppage, both cylinder devices 54A, 54B of the braking device 9 are contracted and the support tables 45A, 45B are swung in the directions in which the tables depart from each other around the vertical shaft axes 46A, 46B so that the brake rollers 53A, 53B are spaced from each other as shown by an imaginary line in FIG. 7.

In association with the feeding-in movement of the travelable body driving device 7 for the truck 1, the brake rollers 53A, 53B are moved to be close to each other with the action counter to the abovesaid action and adapted to abut on the both sides 2a, 2b of the main body 2. At this time, the brake rollers 53A, 53B are rotated to the sides opposite to those of the pressing rollers 23A, 23B. Detailedly, the output shafts 52A, 52B are rotated in the directions opposite to each other by torque motors 49A, 49B through the reduction gears 51A, 51B and both brake rollers 53A, 53B are forcedly counterrotated in such a manner that the brake roller 53A is rotated in a direction C. Consequently, when the brake rollers 53A, 53B in operation are pressed against the side surfaces 2a, 2b of the main body 2 of the truck 1, the truck 1 undergoes a force exerted in a direction E which is reverse to the moving direction B (FIG. 2) of the truck 1. The force exerted by the pressing rollers 23A, 23B (FIG. 2) so as to move the truck 1 in the direction B is larger in intensity than the force exerted by the brake rollers 53A, 53B in the direction E. Consequently, a resultant force, which is equivalent to the difference between the above-mentioned two forces, causes the truck 1 to be moved in a direction D with the brake half on. The load exerted by this resultant force on the torque motors 49A, 49B is absorbed by the torque motors 49A, 49B.

As a result, the truck 1 corresponding to the downstream side of the conveyance direction is conveyed while being subjected to braking. A plurality of trucks 1, therefore, are closely aligned one by one without interruption between the travelable body driving device 7 and the braking device 9. Therefore, when assembling of parts of a product is performed depending on the conveyor system, upper surfaces of a plurality of aligned trucks 1 can be utilized as a flat working table, whereby operation and walking of the operator are always kept safe. The truck 1 subjected to pushing from the rear side by the braking device 9 is conveyed to the subsequent process by the travelable body driving device 8 for conveying-out.

The maximum amount of inward swing motion of the support tables 45A, 45B caused by the cylinder devices 54A, 54B is controlled by stopping action generated when the stroke adjusters 61A, 61B abut on the rear sides of the main bodies 55A, 55B. In this way, eating force of the brake rollers 53A, 53B against the sides 2a, 2b is adjusted not to be excessive, thereby overload being prevented. Braking action of the braking device 9 is released before or after the suspension of conveyance performed by the travelable body driving device 7.

Respective servomotors 19A, 19B in each of the travelable body driving devices 6 through 8 and torque motors 49A, 49B in the braking device 9 are made electrically synchronous with each other.

Other embodiments of this invention will then be described.

In FIGS. 8 through 11, the reference numeral 71 indicates a first rail having an I-shaped cross-section and being fixed to and supported by the beams of the ceiling through the brackets 72. In the first rail 71, a signal.-power supply device 73 is disposed throughout the length of the side reverse to that on which the brackets 72 are connected to each other. The numeral 75 indicates a travelable body supported and guided by the first rail I. This travelable body 75 is provided with a pair of trolley main bodies 76, 77 disposed in the front and rear sides along the traveling direction, a reduction gear 78 fixed to the upper part of the front trolley main body 76, a driving device 79 acting in association with the reduction gear 78, and a driving wheel 81 which is fitted on the transverse output shaft 80 projecting from the reduction gear 78 and rides on the first rail 1. The travelable body 75 is further provided with: a transverse shaft 83 fixed to the upper part of the rear trolley main body 77 through the bearing 82; a follower wheel 84 fitted on the abovesaid shaft 83 and riding on the first rail 1; side swing preventive rollers 85, 86 fitted on both trolley main bodies 76, 77 and capable of abutting on upper both ends and lower both ends of the first rail 71; and a floating preventive roller 88 fitted on the front trolley main body 76 through the spring 87 and capable of abutting on the underside of the first rail 71.

Furthermore, the travelable body 75 is provided with: a longitudinal connecting lever 91 for connecting both trolley main bodies 76, 76 through the connectors 89, 90; a floating preventive rollers 92 fixed to the side of the connecting lever 91 at a position near the rear trolley main body 77 and capable of abutting on the underside of the first rail 71; a power collecting device 93 fixed to the front trolley and slidable on the signal.-power supply device 73; and a control board 94 fixed to the connecting lever 91.

A power transmitter 95 is provided for the travelable body 75. In detail, a pair of transverse pins 97, 98 are fixed to the forward end underside of the connecting lever 91 in the longitudinal direction through the bracket 96 and a power transmitter 95 is vertically swingably fixed to the transverse pin 98 on the rear side. A power transmitter 25 is directed forward and an operation lever 99 swinging with the transmitter 25 in one body extends rearward. Oppositely to the power transmitter 25, a dog 100 is vertically swingably fixed to the transverse pin 97 on the front side. The power transmitter 95 and the dog 100 are usually energized by a weight so as to be lowered at free end. In this way, a travelable body conveying device 102 for conveying the travelable body 75 on the circulatory path 101 is constructed as shown in FIG. 12.

The circulatory paths 101 are provided in pair, for example, to be spaced from each other as shown in FIG. 12 and a loop-like conveying device 110 is provided between both circulatory paths 101.

As shown in FIGS. 8 through 10 and FIG. 16, a pair of second rails 111 are disposed transversely along and below the first rail 71. These second rails 111 are supported by the ceiling beams through the brackets 112 and a trolley device 114 travelable on the fixed path 113 of the conveying device 110 while supported and guided by the second rails 111 is provided.

The trolley device 114 is composed of: a transverse pair of front trolleys 115, a transverse pair of rear trolleys 116; a frame 119 connected to two trolleys 115, 116 on one transverse side through the connecting member 117 and supported by the two trolleys 115, 116 on the other transverse side through the transverse slide mechanism 118; guide rollers 120, 121 fixed to both trolleys 115, 116 and supported and guided by the second rails 2; a side swing preventive roller 122; and floating preventive rollers 124, 125.

A hanger 126 is fixed to the frame 119 and provided with vertical rods 127 depending from a plurality of places on both sides of the frame 119 and with receiving pieces 128 projecting inwardly from the lower end of the vertical lever 127.

A cross-sectionally rectangular pipe-like pressure receiving body 129 is longitudinally disposed on the central portion of the widthwise direction on the upper surface of the frame 119. A detachable follower 130 with which the power transmitter 95 for the travelable body 75 is engageable is provided to project from the upper surface of the pressure receiving body 129. The pressure receiving body 130 and power transmitter 95 compose a power transmission device 105 which makes the trolley device 114 engageable with or disengageable from the travelable body 75. A follower engageable part 131 is provided in a position near one side on the frame 119.

As shown in FIG. 8 and FIGS. 13 through 15, tractive means 132 is provided on the rear underside of the pressure receiving body 129 and, on the front side, follower drawn means 133 is provided. Both means 132, 133 composing a tractive device 134. In detail, a vertical shaft 135 is suspended downward on the front side of the pressure receiving body 129 and follower drawn means 133 is projected forwardly from the cylinder 137 fitted on the vertical shaft 135 and being rotatable around the vertical shaft axis 136. On the forward end of follower drawn means 133, follower engageable means 138 is upwardly projectingly formed and a semicircular recess 139 is formed on the surface of the projection 138 on the side of the vertical shaft 135 and in the central portion of the widthwise direction of the projection 138. A tension spring 142 is extended between the projection 140 projecting rearwardly from the cylinder 137 and the bracket 141 fixed to the underside of the pressure receiving body 129 for maintaining the neutrality of tractive means 132.

A transverse shaft 143 is fixed to the pressure receiving body 129 at the rear side through the bracket 150 and, to this shaft 143, tractive means 132 is vertically swingably fixed. An engageable projection 144 engaging with a mating engageable projection 138 from above is downwardly connected to the rear end of tractive means 132, and an engageable roller 145 is fixed to the recess 139 through the vertical pin 146. Tractive means 132 is kept horizontal by a stopper 147 fixed to the bracket 150 and a wheel 145 for moving tractive means 132 upward (for separating motion) is fixed to the rear end of tractive means 132 through the transverse pin 149.

As shown in FIG. 12, a travelable body driving device 160 is provided near the junction between the conveying device 110 and the travelable body conveying device 102. As shown in FIGS. 16 through 19, a frame-like bed 161 is provided between opposing internal surfaces of the second rails 11. The bed 161 supports a pair of vertical shafts 163 arranged in the transverse direction through the brackets 162, and support tables 165 are rotatably fixed to the upper ends of both vertical shafts 163 through bearings 164. On the upper surfaces of the support tables 165, servomotors 166 and reduction gears 167 movably connected to the servomotors 166 are provided. Vertical driving shafts 170 are rotatably disposed on the brackets 168 downwardly suspending from the undersides of both support tables 165 through the bearings 169. The upper ends of the driving shafts 170 are connected to the lower ends of the output shafts 171 downwardly projecting from the reduction gears 167 through the couplings 172. To the lower ends of the driving shafts 170, pressing rollers 173 made of, for example, urethane are fixed. Both pressing rollers 173 can be brought close to and distant from each other by swinging the support tables 165 around the axes of the vertical shafts 163, and are set at a level permitting both rollers to abut on both surfaces of the pressure receiving body with the approach of both rollers.

A device 174 for bringing both pressing rollers 173 close to and distant from each other comprises: longitudinal raisl 173 provided on the beds 161 between the support tables 165; sliding bodies 176 supported and guided by said rails 175; a pair of links 179 connected to the sliding bodies 176 at base end through the vertical pins 177 and also connected to the support tables 165 at free end through the vertical pins 178; and a push-pull lever 181 connected to the vertical pin 177 at one end and acting, at the other end, in association with a cylinder 180. A plurality of rollers 182 for supporting the support tables 165 are provided on the beds 161.

Figure 19:
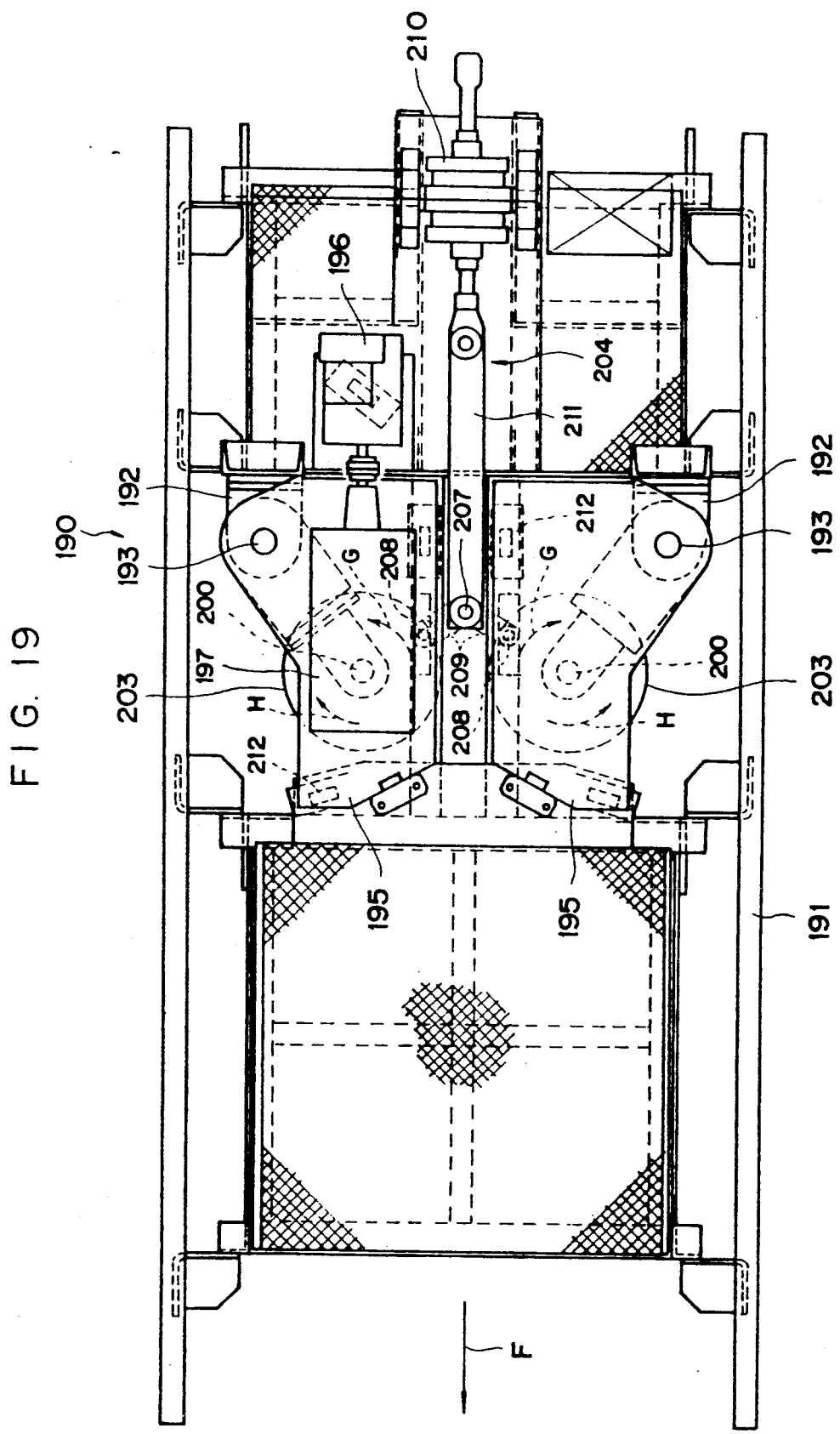
FIG. 19 is a plan view of the braking device in FIG. 12.
Figure 20:
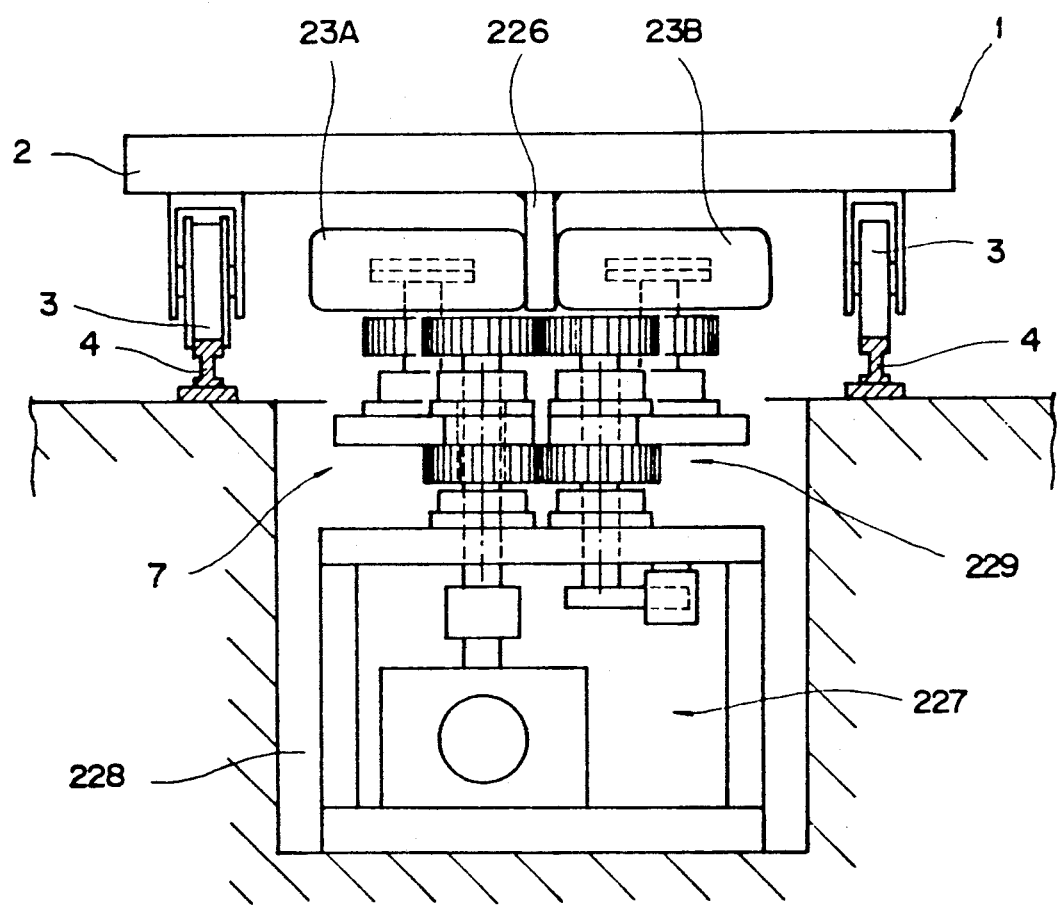
FIG. 20 is a front view of a travelable body driving device in the conveying apparatus as a further embodiment of this invention.

As shown in FIG. 12, a braking device 190 is provided near the divergent point of the conveying equipment 110 from the travelable body conveying device 102. The braking device 190, as shown in FIG. 19, is in the same structure as that of the travelable body driving device 160. The reference numeral 191 indicates a bed; 192, bracket; 193, vertical shaft; 195, support table; 197, reduction gear; 200, driving shaft; 203, pressing roller; 204, actuating device; 207, 208, vertical pin; 209, link; 210, cylinder; 211, push-pull lever; and 212, roller. The reduction gear 197 is provided on one side only and movably connected to the torque motor 196.

Figure 11:
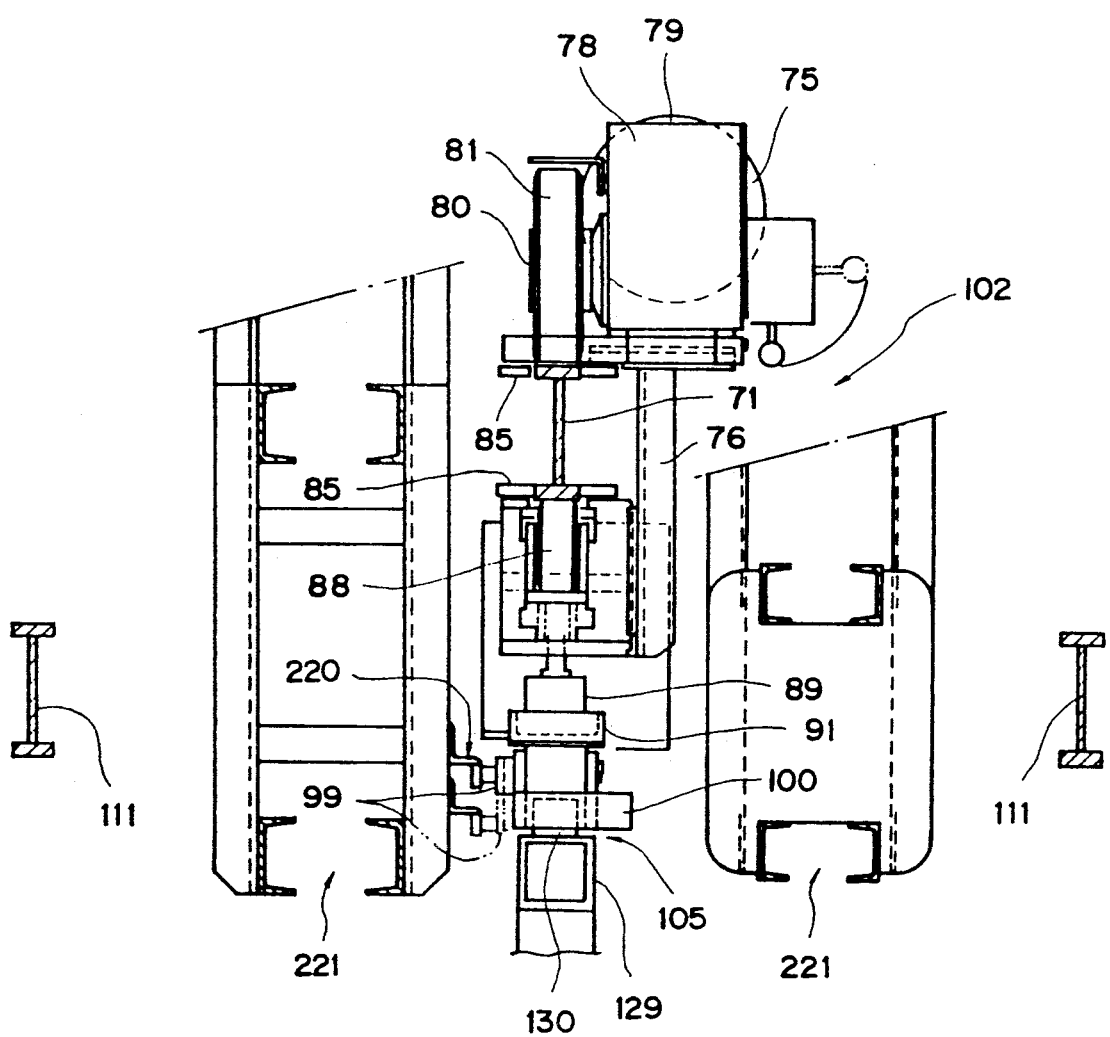

As shown in FIGS. 11 and 12, releasing means 220 (a pair of guide rails) actuating upward (for releasing motion) the power transmitting device 95 are provided on the upstream side of the braking device 190 and a feeder 221 acting on the follower engageable body 131 adapted to convey the trolley device 144 is provided between said releasing means 220 and the braking device 190.

Figure 15:
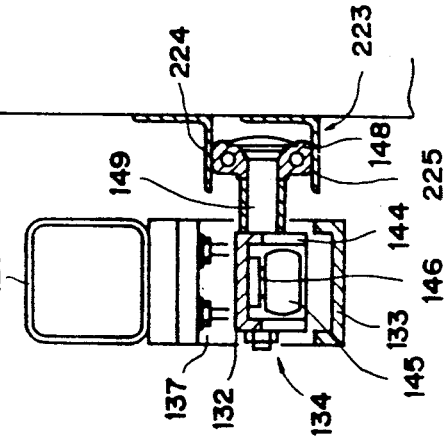
FIG. 15 is a sectional view taken along the line V—V in FIG. 13.
Figure 14:
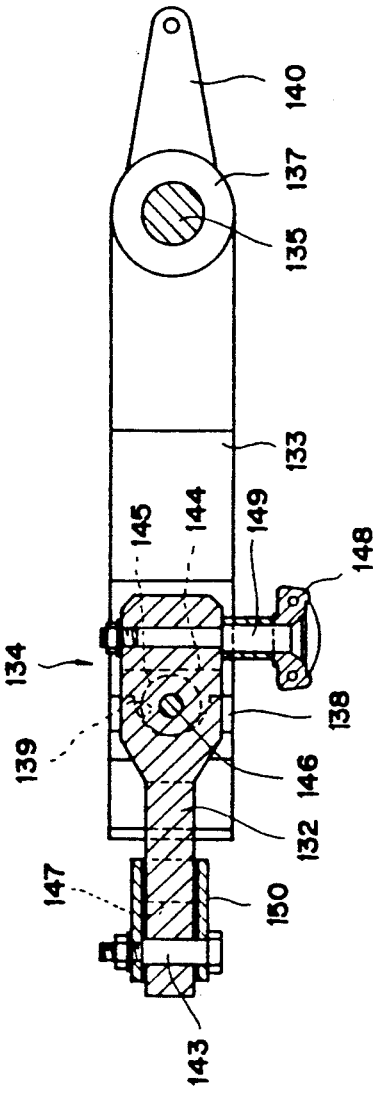
FIG. 14 is a sectional view taken along the line X—X in FIG. 13.

Within the range from the position of the braking device 190 to that of the travelable body driving device 160, guide means 223 for the wheel 148 is provided. Guide means 223, as shown in FIG. 15, is composed of the upper guide rail 224 and the lower one 225 so that the wheel 148 is positioned therebetween for maintaining engagement between tractive means 132 and follower drawn means 133. Both guide rails 224, 225 rise upward for guiding the wheel 145 upward after passing the part corresponding to the travelable body driving device 160.

An operation to convey the trolley device 114 will be described.

In the place not subjected to action of the travelable body conveying device 102, that is, a space between the braking device 190 and the travelable body driving device 160, the trolley devices 114 are kept in storage and conveyed while connected to each other. As shown in FIG. 8 and FIGS. 13 through 15, the roller 145 of tractive means 132 of the tractive device 134 engages with the recess 139 of another driving means 133 from above and engagement therebetween is firmly maintained because of positioning of the wheel 148 between guide rails 224, 225 of the guiding device 223.

Figure 16:
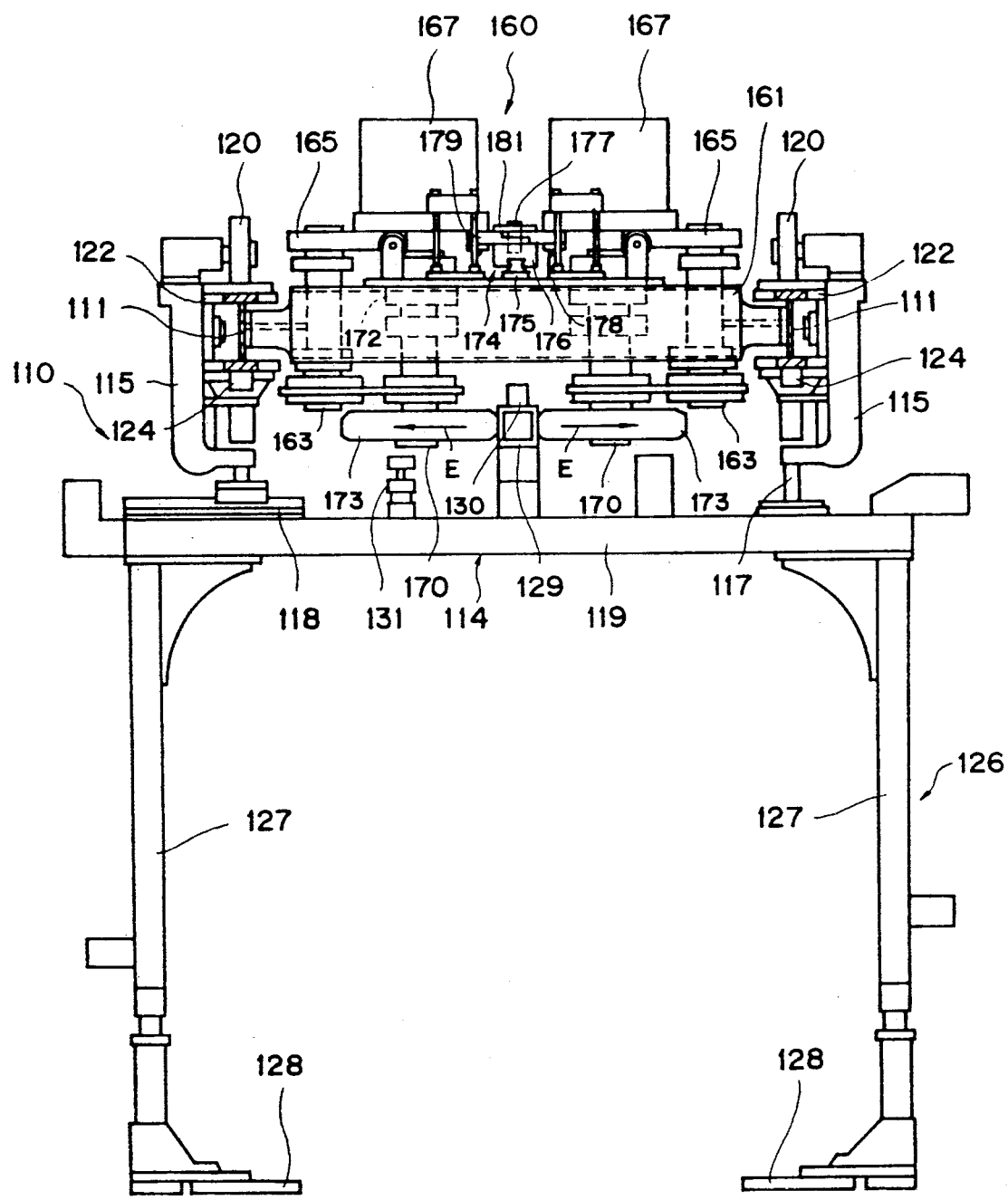

In the travelable body driving device 160, as shown in FIGS. 16 through 18, the push-pull lever 181 is drawn by contraction of the cylinder 180 and pulling force acts on the support table 165 through the link 179. Thus, the support tables 165 swing around the vertical shafts 163 in such directions that both tables draw closer to each other and both pressing rollers 173 are adapted to abut on both surfaces of the pressure receiving body 129. At this time, both pressing rollers 173 are driven in the directions opposite to each other. In detail, the output shaft 171 is rotated by the servomotor 166 and revolutions of the driving shaft 170 rotating integrally with and through the coupling 172 are transmitted to the pressing rollers 173 so that both pressing rollers 173 are forcedly rotated in the directions E opposite to each other.

With these pressing rollers 173 under forced rotation adapted to abut on both surfaces of the pressure receiving body 129, conveying force is exerted on the trolley device 114, whereby the trolley device 114 is conveyed in the direction F of the fixed path 113. At this time, the trolley device 114 draws the succeeding trolley devices 114 through tractive means 134. During the operation to draw the trolley device 114 for conveyance by the use of the travelable body driving device, at the trolley device 114 positioned on the rear end side, the pressing roller 203 of the braking device 190 is pressed to the side pressure receiving body 129. In this way, the trolley devices 114 are prevented from running away and no gap is produced in the engagement of tractive means 134, whereby smooth conveyance and storage without noise caused by strike of parts are ensured. At this time, rotating force in the direction G opposite to that F of conveyance acts, as shown in FIG. 19, on both pressing rollers 203 of the braking device 190, however, compulsive rotational force of the travelable body driving device 160 is substantially stronger than that in the direction G and, as a result, both pressing rollers 203 are rotated in the same direction H as that of the pressing rollers 173 to generate braking action.

Conveyance depending on traction is performed on the fixed path 113 as described above and, when an inclining part 113a is provided on the fixed path 113 as shown in FIG. 12, relative direction changing force proportional to the degree of inclination are generated in the front and rear ends of tractive means 114 but can be absorbed by turning follower drawn means 133 around the vertical shaft axis 136 in opposition to the tension spring 142, whereby engagement between the recess 139 and the roller 145 is maintained.

Figure 13:
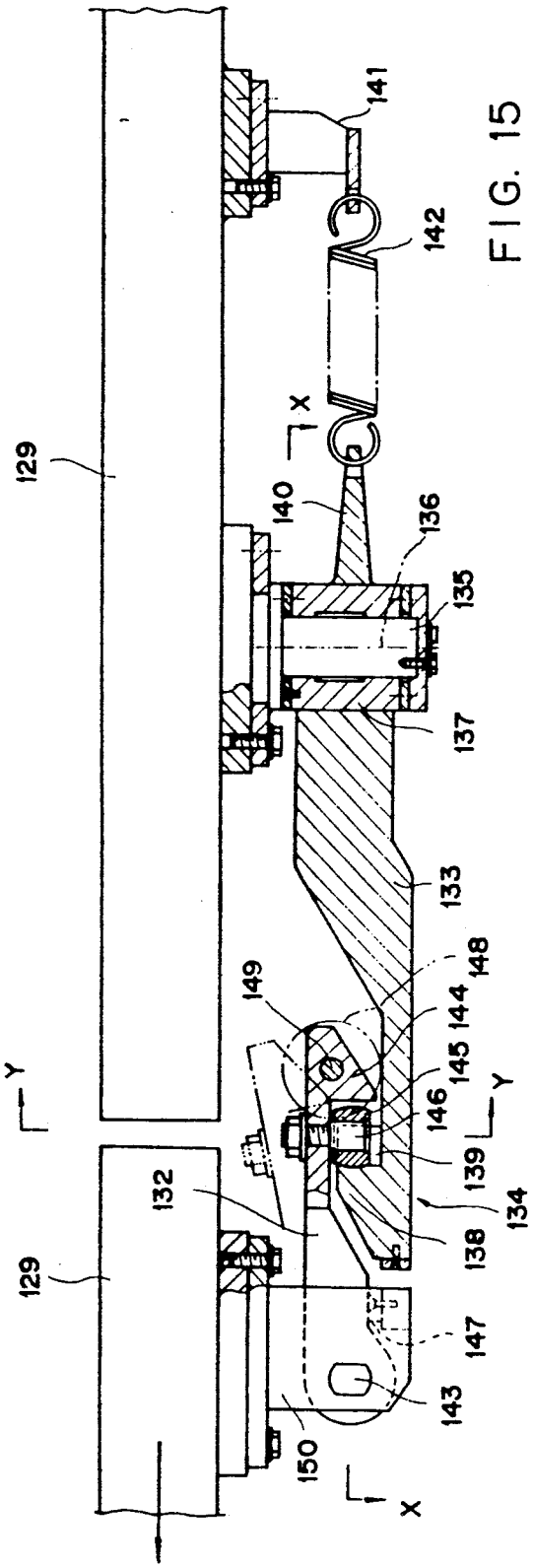
FIG. 13 is a partially cutaway side view of a tractive device.

When the trolley device 114 is completely conveyed out by the travelable body driving device 160, the guide wheel 148 is guided to the rising part of guide means 223 and thereby tractive means 132 is moved upward around the transverse shaft 143 as shown by an imaginary line in FIG. 13 and disengaged from the recess 139.

Figure 9:
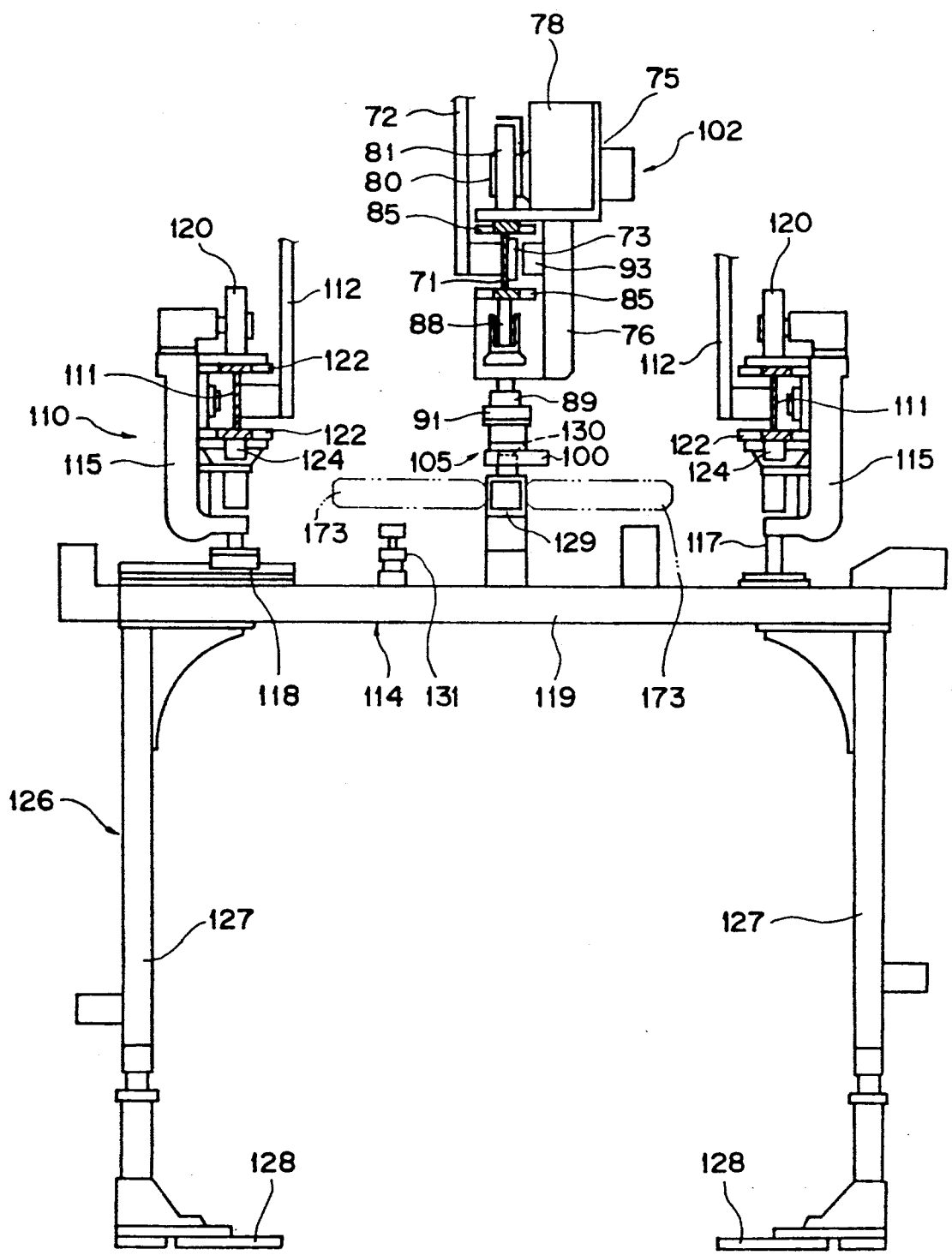
FIGS. 9 through 11 are a front, side, and plan views of the travelable body conveying device, respectively.
Figure 10:
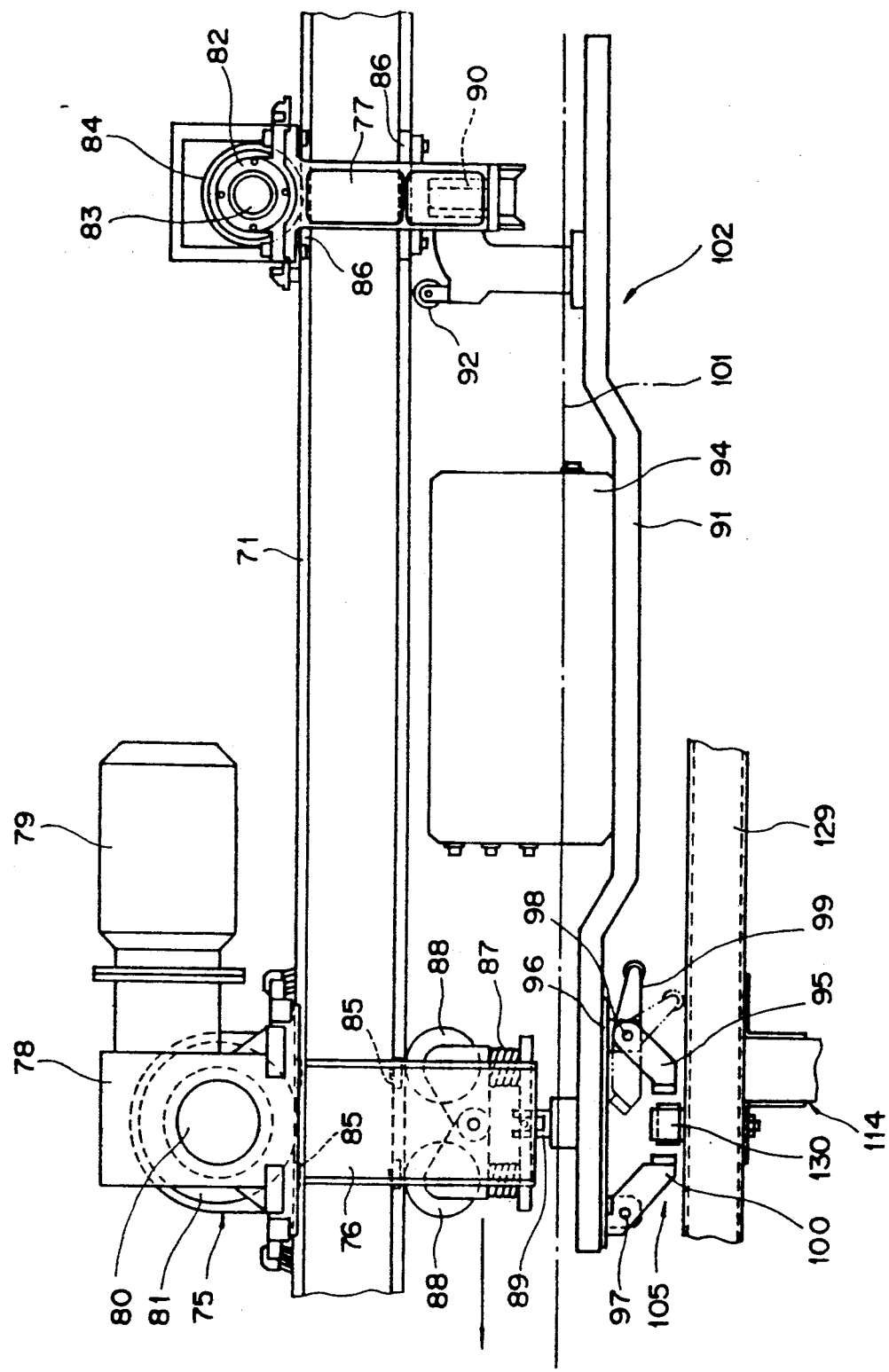

In this way, to the trolley device 144 put into a free state, the travelable body 75 on the travelable body conveying device 102 is connected through a power transmission device 105. In detail, as shown in FIGS. 9 and 10, a follower 130 is positioned between the power transmitting body 95 and the dog 100 and connection is performed by springing up the power transmitting body 95 with the follower 130 having been moved or by springing up the follower in stoppage with the dog 100 having moved.

The travelable body 75 can adapt the trolley device 114 to travel with traveling of its own in the state in which the transmitting device 105 is connected to the follower 60. At this time, the driving wheel 81 is forcedly rotated with the driving device 79 actuated. Then, the travelable body 75 is supported on the first rail 71 through a plurality of wheels 81, prevented from transverse swing by a plurality of transverse swing preventive rollers 85, 86 and from floating by a plurality of the floating preventive rollers 88, 92 so as to run on the circulatory path 101. Traveling force is transmitted from the power transmitting body 95 to the trolley device 114 through the follower 130. Thus, the trolley device 114 is supported and guided by the second rails 11 through guide rollers 120, 121 and transverse swing preventive rollers 122, 123 so as to run on the fixed path 113.

The trolley device 114 is prevented from running away on account of strike of the follower 130 with the dog 100. Supply of power to the travelable body 75 depends on sliding contact of the power collector 93 with the signal power supply device 73, when transmission and reception of signals are performed between a control part on the ground and a control board for control over stoppage and running, so as to confirm the presence of the trolley device.

In bringing the trolley device 114 which has been driven as above into storage on the fixed path 113, engagement of the power transmission device 105 is released by releasing means 220. In detail, a manipulating lever 99 is operated by releasing means 220 as shown by an imaginary line and continuous line in FIG. 11 and the power transmitting body 95 is swung upward as shown by an imaginary line in FIG. 10. Thus, the travelable body 75 passes away whereas the trolley device 114 is left behind. The feeder device 221 acts on the follower 131 of the trolley device 114 left behind so as to engage therewith and the connector 144 of a trolley device is connected to that of the preceding trolley device 114 at the downstream side of the braking device 190 by the feeding action of the feeder device 221. Connection as above is automatically performed by strike of the follower projection 138 of follower drawn means 133 with the engaging projection 144 of tractive means 132 for raising tractive means 132.

Still another embodiment of this invention will be described.

The structure of the embodiment is similar to that of the aforesaid embodiment as shown in FIGS. 1 through 7. However, the embodiment of this invention is different from the others in that a plate-like pressure receiving body 226 is downwardly suspended from the center of the underside of the main body 2 of the truck 1 and pressing rollers 23A, 23B are pressed to both side surfaces of the pressure receiving body 226. Since both rollers 23A, 23B are disposed between both rails 4, 4, a driving source 227 for both rollers 23A, 23B is provided in a pit 228 formed between the rails 4, 4. Both rollers 23A, 23B are driven together by one servomotor 19 only with the use of a train of gears.

In the above described embodiments, a pair of pressing rollers 23A, 23B, and 173 capable of being brought closer to and distant from a travelable body are used for conveyance of the travelable body, however, the purpose may be satisfied by forming one of a pair of pressing rollers into conveyance type and the other into stationary type. Further, an alternative including pressing rollers of driving type and the others of idle type not transmitting power may suffice. Instead of rollers, a traveling belt to be pressed to the travelable body may be used for driving the travelable body.

We claim:

1. A device for conveying travelable bodies provided with:
    a fixed path allowing a string of travelable bodies to freely travel thereon with a front edge of one travelable body always kept in contact with a rear edge of another travelable body;
    means to transmit traveling power to said travelable bodies;
    said means to transmit traveling power to said travelable bodies comprising means for subjecting one side of each of said travelable bodies to friction drive and back-up means for subjecting the other side of each of said travelable bodies to pressure at a point opposite said friction drive,
    and means for applying braking power to both sides of to said travelable bodies; and
    said means to transmit traveling power to said travelable bodies and said means for applying braking power to said travelable bodies being disposed in a manner such that, when a leading one of said travelable bodies comes to have both its sides pressed laterally by said means for applying braking power to said travelable bodies, a rearmost one of said travelable bodies comes to have both its sides pressed laterally by said means to transmit traveling power to said travelable bodies.

2. A device for conveyance as set forth in claim 1, wherein said back-up means presses the other side of the travelable body and drives said travelable body with frictional force.

3. A device for conveyance as set forth in claim 1, wherein said means to transmit traveling power is provided with:
    vertical shafts disposed aside said fixed path;
    support tables pivotally mounted on said vertical shafts;
    pressing rollers provided on said support tables and pressed to side surfaces of the travelable body with swing motion of the support tables;
    means provided on said support tables and said pressing rollers for rotation; and
    telescopic driving means for swinging said support tables.

4. A device for conveyance as set forth in claim 1, wherein braking power applied by said means for applying braking power to said travelable bodies is smaller than the driving force applied by said means to transmit traveling power to said travelable bodies.

5. A device for conveyance as set forth in claim 4, wherein said means for applying braking power is provided with:
    braking roller means capable of abutting on a side surface of the travelable body; and
    means to act in association with said braking roller means and to impart rotational force to said braking roller means for counter-conveyance.

6. A device for conveyance as set forth in claim 3, wherein the travelable body is provided with a pressure receiving body extending in the direction of travel of said travelable body and traveling power transmitting means acts upon both side surfaces of said pressure receiving body.

7. A device for conveyance as set forth in claim 6, wherein a pair of support tables, a pair of pressing rollers, and a pair of rotatably driving means are disposed on both sides, respectively, of the pressure receiving body, and an operative device is provided for bringing both support tables close to and distant from each other while swinging both tables so that both pressing rollers may concurrently draw closer to or be spaced from the pressure receiving body.

8. A device for conveyance as set forth in claim 1, wherein connecting means capable of establishing connection and disconnection between front and rear ends of aligned travelable bodies.

9. A device for conveyance as set forth in claim 8, wherein said device is provided with:
    tractive means disposed in rear of one of said aligned travelable bodies and made vertically swingable;
    an engageable projection upwardly formed at a rear end of said tractive means;
    a roller provided on a part of said tractive means in front of said engageable projection;
    follower drawn means disposed on a front side of the other of said aligned travelable bodies and swingable in a horizontal direction;
    a resilient body to impart resilience to a tip of said follower means for keeping said follower means in a neutral position;
    a follower projection downwardly formed on said follower drawn means, said engageable projection being engageable with said follower projection; and,
    a recess provided on a part of said follower drawn means in rear of the follower projection and capable of engaging with and disengaging from the roller provided on said tractive means.

10. A device for conveyance as set forth in claim 1, wherein the travelable body is in the form of a truck and a plate-like pressure receiving body extending in the travelling direction of said truck is downwardly suspended from the center of an underside of said truck and traveling power transmitting means acts upon both side surfaces of said pressure receiving body.

* * * * *